United States Patent
Goutsu et al.

(10) Patent No.: US 8,544,592 B2
(45) Date of Patent: Oct. 1, 2013

(54) STEERING APPARATUS FOR VEHICLE

(75) Inventors: Takayuki Goutsu, Yokohama (JP); Kenichi Kouno, Isehara (JP); Masahiro Kubota, Yokohama (JP); Yuwun Chai, Isehara (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 246 days.

(21) Appl. No.: 13/089,345

(22) Filed: Apr. 19, 2011

(65) Prior Publication Data
US 2011/0259663 A1 Oct. 27, 2011

(30) Foreign Application Priority Data
Apr. 21, 2010 (JP) ................................. 2010-097941

(51) Int. Cl.
*B62D 5/04* (2006.01)
(52) U.S. Cl.
USPC ......................................... 180/402; 180/446
(58) Field of Classification Search
USPC ......................................... 180/443, 446, 402
See application file for complete search history.

(56) References Cited

U.S. PATENT DOCUMENTS

| | | | |
|---|---|---|---|
| 5,347,458 A | 9/1994 | Serizawa et al. | |
| 7,275,617 B2 * | 10/2007 | Endo et al. | 180/402 |
| 2008/0185212 A1 | 8/2008 | Akuta et al. | |

FOREIGN PATENT DOCUMENTS

| | | |
|---|---|---|
| CN | 101434258 A | 5/2009 |
| CN | 101596915 A | 12/2009 |
| EP | 1 243 496 A2 | 9/2002 |
| EP | 1 795 430 A2 | 6/2007 |
| JP | 2001-138936 A | 5/2001 |
| JP | 2006-182056 A | 7/2006 |
| JP | 2007-099060 A | 4/2007 |

* cited by examiner

*Primary Examiner* — Kevin Hurley
(74) *Attorney, Agent, or Firm* — Foley & Lardner LLP

(57) ABSTRACT

To prevent a generation of a large change of a steering reaction force at the time of starting and stopping steering so as to reduce a feeling of strangeness of a driver, while controlling driven wheels with high responsivity with respect to steering. A steering control unit 25 controls a steering motor 7 based on a final target turning angle θt obtained by an addition of a first target turning angle θ1 and a second target turning angle θ2. A reaction force control unit 26 controls a reaction force motor 3 based on a final target steering reaction force Tt obtained by an addition of a first target steering reaction force T1 and a second target steering reaction force T2. In this case, a second target steering reaction force calculation unit 24 calculates the second target steering reaction force T2 based on a value obtained by a variation restriction of the second target turning angle θ2 based on a steering angular velocity θt (second turning angle correction value θ2a).

11 Claims, 11 Drawing Sheets

(a)

(b)

(c)

(a)

(b)

(c)

STEERING APPARATUS FOR VEHICLE

This application claims priority from Japanese Patent Application 2010-097941, filed Apr. 21, 2010, which is incorporated herein by reference in its entirety.

TECHNICAL FIELD

The present invention relates to a steering apparatus for a vehicle.

BACKGROUND ART

For example, Patent Document 1 discloses a steering device for a vehicle using a steer-by-wire system, in which a steering wheel and a steering system toward driven wheels are mechanically disconnected, and a relationship between a steering angle as an operation amount (steering amount) of the steering wheel by a driver and a turning angle as a turning amount of the driven wheels can be set arbitrarily. According to the device, a target turning angle of the driven wheels is calculated according to the steering angle and a steering angular velocity. In addition, the driven wheels are controlled so that the turning angle of the driven wheels is to be a target turning angle, and steering reaction force is applied to the steering wheel according to the steering angle. Since the target turning angle of the driven wheels is calculated according to the steering angle and the steering angular velocity, the driven wheels can be steered (controlled) with high responsivity with respect to steering by a driver.

In addition, Patent Document 2 discloses a method for calculating a target turning angle of driven wheels according to a steering angle and steering angular velocity so as to control a driving means to steer the driven wheels based on the target turning angle, and a method for controlling steering reaction force for a steering wheel based on the target turning angle.

CITATION LIST

Patent Literature

Patent Document 1: Japanese Patent Application Laid-Open Publication No. 2007-099060
Patent Document 2: Japanese Patent Application Laid-Open Publication No. 2001-138936

SUMMARY OF INVENTION

Technical Problem

According to the disclosure of Patent document 1, although a vehicle behavior is changed since the turning angle of the driven wheels is changed even after stopping steering, the steering reaction force is not changed. Thus, a driver may have a feeling of strangeness with regard to a gap between the steering reaction force and the vehicle behavior. According to the disclosure of Patent Document 2, since the steering reaction force is applied to the steering wheel based on the target turning angle, a driver may avoid feeling the gap between the steering reaction force and the vehicle behavior. However, the steering angular velocity is largely changed at the time of starting and stopping steering, thereby causing a large change of the steering reaction force. As a result, a driver may have a feeling of strangeness with respect to the reaction force.

The present invention has been made in view of such conventional issues. It is an object of the present invention to prevent a large change of a steering reaction force from causing at the time of starting and stopping steering so as to reduce a feeling of strangeness of a driver, while controlling driven wheels with high responsivity with respect to steering.

Solution to Problem

In order to achieve the above-mentioned object, according to the present invention, a first target turning angle is calculated based on a detected steering angle, and a second target turning angle is calculated based on a steering angular velocity. In addition, a first target steering reaction force is calculated based on the calculated first target turning angle, and a second target steering reaction force is calculated based on a value obtained by a variation restriction of the calculated second target turning angle. Accordingly, driven wheels are controlled based on a final target turning angle obtained by an addition of the first target turning angle and the second target turning angle, and a steering reaction force is controlled based on a final target steering reaction force obtained by an addition of the first target steering reaction force and the second target steering reaction force.

Advantageous Effects of Invention

According to the present invention, the driven wheels are controlled based on the final target turning angle obtained by adding the first target turning angle based on the steering angle and the second target turning angle based on the steering angular velocity. Therefore, the driven wheels can be steered with high responsivity with respect to steering by a driver. Moreover, the first target steering reaction force is calculated based on the first target turning angle based on the steering angle, and the second target steering reaction force is calculated based on the value in which the change of the second target turning angle based on the steering angular velocity is controlled. Further, the steering reaction force is controlled based on the final target steering reaction force obtained by adding the first and second target steering reaction forces. Therefore, the change reflected by the second target steering reaction force and further reflected by the final target steering reaction force is prevented even when the second target turning angle is greatly changed. Thus, an occurrence of a large change of the steering reaction force at the time of starting and stopping steering can be prevented. Accordingly, a feeling of strangeness of a driver can be reduced, while driven wheels are controlled with high responsivity.

BRIEF DESCRIPTION OF DRAWINGS

FIG. 11 is a block diagram showing a constitution of a first calculation unit 242a.

FIG. 14(a) is an explanatory diagram showing a comparison of cases with control and without control according to a first embodiment, and showing a transition pattern between a typical steering input (steering angle θ) and a corresponding first target turning angle θ1.

FIG. 14(b) is an explanatory diagram showing a comparison of cases with control and without control according to a first embodiment, and showing a transition pattern between a second target turning angle θ2 corresponding to the input of FIG. 14(a) and a second turning angle correction value θ2a.

FIG. 14(c) is an explanatory diagram showing a comparison of cases with control and without control according to a first embodiment, and showing a transition pattern between a final target steering reaction force Tt calculated from the second turning angle correction value θ2a shown in FIG. 14(b) and a final target steering reaction force Tt1 calculated from the second target turning angle θ2 not corrected.

DESCRIPTION OF EMBODIMENTS (First Embodiment)

Figure 1:
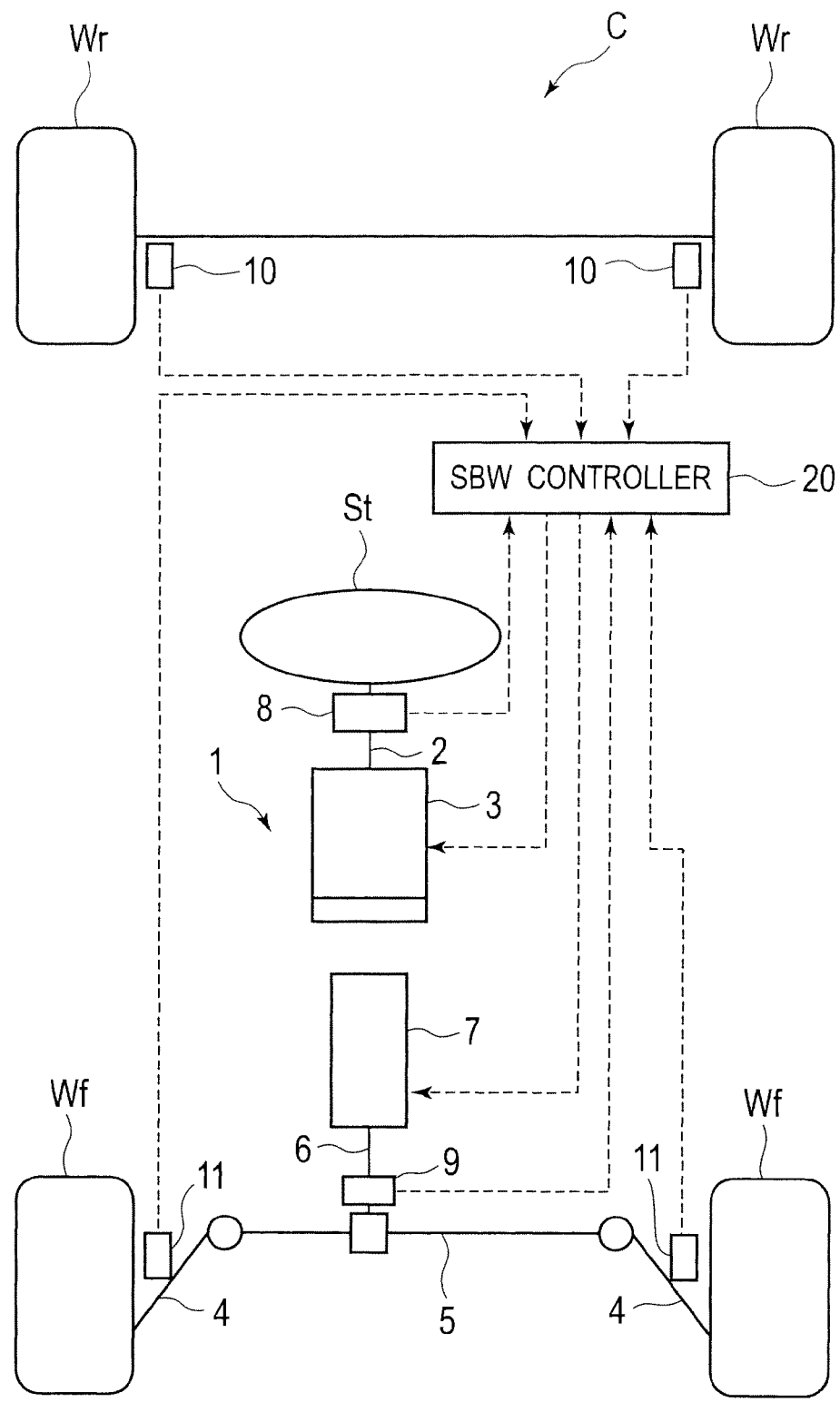
FIG. 1 is an explanatory diagram typically showing a constitution of a vehicle C to which a steering apparatus for a vehicle 1 according to a first embodiment is applied.

FIG. 1 is an explanatory diagram typically showing a constitution of a vehicle C to which a steering apparatus for a vehicle 1 according to the first embodiment is applied. In this vehicle C, when a steering wheel St is operated (steered) by a driver, front wheels Wf as driven wheels are steered by the steering apparatus for a vehicle 1 using a steer-by-wire system. In the steer-by-wire system, the steering wheel St and a steering system toward the front wheels Wf are mechanically disconnected, and a relationship between a steering angle as an operation amount of the steering wheel St by a driver and a turning angle as a turning amount of the front wheels Wf is set arbitrarily.

The steering wheel St is fixed to one end of a steering shaft 2, and the other end of the steering shaft 2 is connected to an output shaft of an electric motor (hereinafter, referred to as a "reaction force motor") 3 as a steering reaction force actuator. Torque generated by the reaction force motor 3 is transmitted to the steering wheel St as a steering reaction force via the steering shaft 2.

The left and right front wheels Wf are connected to knuckle arms (not shown in the figure), respectively. Each knuckle arm is connected to a rack 5 via tie rods 4. A pinion shaft 6 is engaged with the rack 5, so as to form a so-called rack-and-pinion. The pinion shaft 6 is connected to an electric motor (hereinafter, referred to as a "steering motor") 7 as a driven wheel drive actuator. Torque generated by the steering motor 7 is transmitted to the rack 5 force via the pinion shaft 6. When the pinion shaft 6 rotates, the rack 5 shifts in a shaft line direction, so that the steering angle of the front wheels Wf are changed according to the shift of the rack 5.

The steering apparatus for a vehicle 1 is provided with, but not shown in the figure, a power transmission mechanism (for example, a clutch to be engaged when trouble arises) capable of transmitting torque by mechanically connecting the steering shaft 2 to the pinion shaft 6 when any trouble arises in the steer-by wire system. Due to the provision of the power transmission mechanism, a driver can operate the front wheels Wf directly by steering the steering wheel St when any trouble occurs in the steer-by-wire system. Hereinafter, the explanation will be made based on a case with no trouble in the steer-by wire system, and the steering shaft 2 and the pinion shaft 6 are mechanically disconnected.

Each rotation output (output torque) of the reaction force motor 3 and the steering motor 7 is controlled by an SBW controller 20. The SBW controller 20 determines the turning angle and the steering reaction force of the front wheels Wf corresponding to the operation of the steering wheels St. To the SBW controller 20, a detection value is input from a detection system including sensors 8 to 11 in order to control the outputs of the motors 3 and 7.

A steering angle sensor 8 is fixed to the steering shaft 2 to detect a steering angle θ based on a rotation angle of the steering shaft 2 (steering angle detection means). For example, the steering angle θ at the time of straight driving corresponding to a neutral position of the steering wheel St is defined as a reference value (for example, zero), so that the steering angle sensor 8 detects the steering angle θ from the reference value. A turning angle sensor 9 is fixed to the pinion shaft 6 to detect a turning angle δ of the front wheels Wf based on a rotation angle of the pinion shaft 6 (turning angle detection means). A vehicle speed sensor 10 is provided at respective left and right rear wheels Wr to detect a velocity V according to a rotation state of the rear wheels Wr. A tire lateral force sensor 11 is provided at a hub portion of the respective left and right front wheels Wf to detect a lateral force (hereinafter, referred to as a "tire lateral force") Fy that is a road surface reaction force acting on tires of the front wheels Wf (lateral force detection means).

The SBW controller 20 functions to integrally control the whole system, and performs various processing for steering control by operating according to a control program. As for the SBW controller 20, a microcomputer mainly composed of a CPU, a ROM, a RAM, and an I/O interface may be used. The SBW controller 20 performs various calculations based on a variety of information according to calculation results detected by the detection system. The SBW controller 20 outputs control signals according to calculation results to the reaction force motor 3 as a reaction force imparting means and to the turning motor 7 as a driven wheel drive means, thereby controlling the steering reaction force and the turning angle δ of the front wheels Wf.

Figure 2:
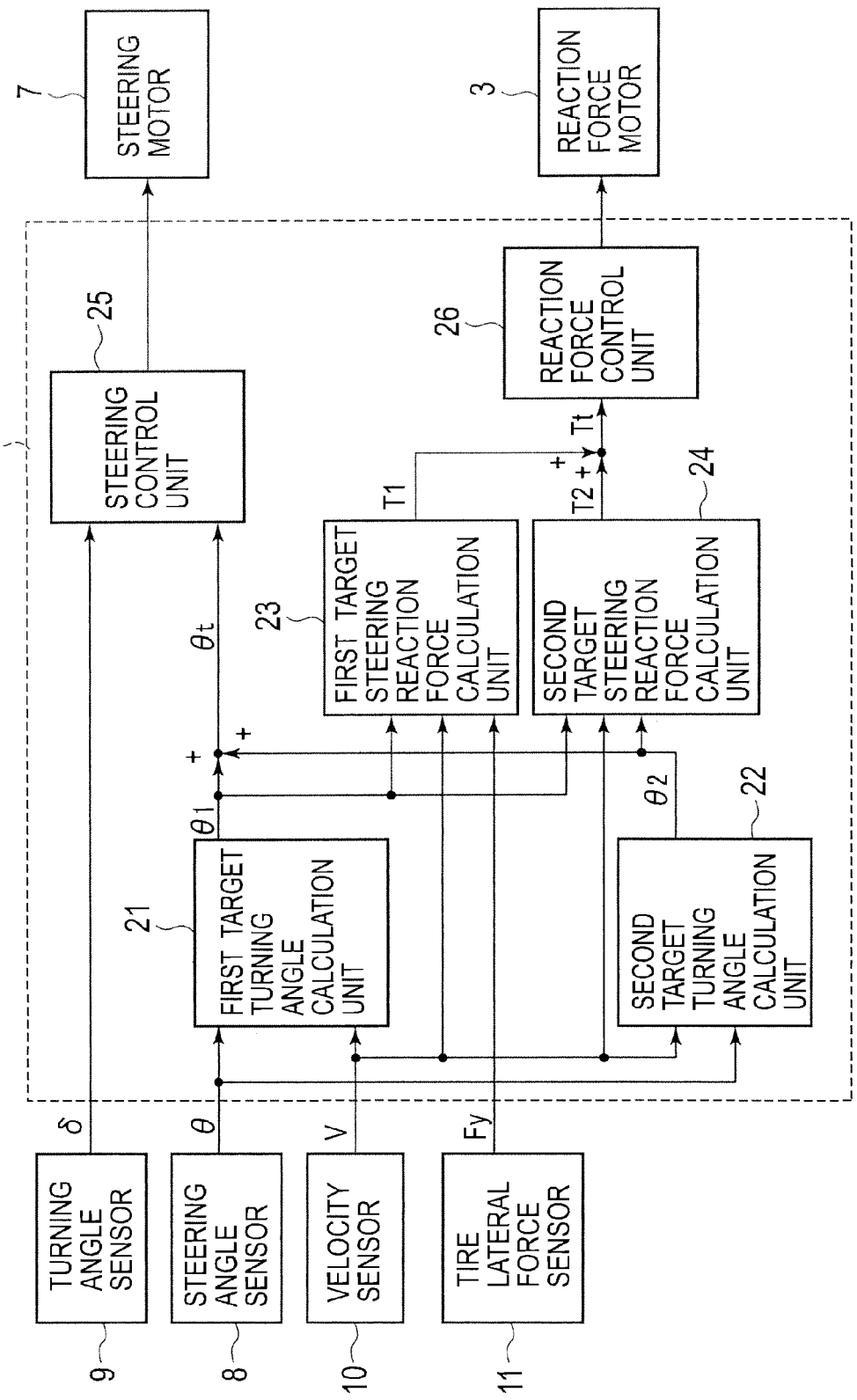
FIG. 2 is a block diagram showing a constitution of an SBW controller 20.

FIG. 2 is a block diagram showing a constitution of the SBW controller 20. The SBW controller 20 includes a first target turning angle calculation unit 21, a second target turning angle calculation unit 22, a first target steering reaction force calculation unit 23, a second target steering reaction force calculation unit 24, a steering control unit 25, and a reaction force control unit 26, when considering the SBW controller 20 functionally.

The first target turning angle calculation unit 21 calculates a first target turning angle θ1 using the steering angle θ and the velocity V as an input (first target turning angle calculation means). The calculated first target turning angle θ1 is output to the first target steering reaction force calculation unit 23 and the second target steering reaction force calculation unit 24, respectively. Further, the calculated first target turning angle θ1 to which a second target turning angle θ2 described below is added by an adder is output to the steering control unit 25 as a final target turning angle θt.

The second target turning angle calculation unit 22 calculates the second target turning angle θ2 different from the first target turning angle θ1 using the steering angle θ and the velocity V as an input (second target turning angle calculation means). The calculated second target turning angle θ2 is output to the second target steering reaction force calculation unit 24 and the adder for the first target turning angle θ1, respectively.

The first target steering reaction force calculation unit 23 calculates a first target steering reaction force T1 using the first target turning angle θ1, the velocity V and the tire lateral force Fy as an input (first target steering reaction force calculation means). The calculated first target steering reaction force T1 to which a second target steering reaction force T2 described below is added by an adder is output to the reaction control unit 26 as a final target steering reaction force Tt.

The second target steering reaction force calculation unit 24 calculates a second target steering reaction force T2 different from the first target steering reaction force T1 using the first target turning angle θ1, the velocity V and the tire lateral force Fy as an input (second target steering reaction force calculation means). The calculated second target steering reaction force T2 is output to the adder for the first target steering reaction force T1.

The steering control unit 25 controls the turning angle δ imparted to the front wheels Wf by controlling the steering motor 7 (driven wheel control means). Specifically, the steering control unit 25 controls the steering motor 7 so that the turning angle δ corresponds to the final target turning angle θt using the turning angle δ and the final target turning angle θt as an input.

The reaction force control unit 26 controls the steering reaction force imparted to the steering wheel St by controlling the reaction force motor 3 (reaction force control means). Specifically, the reaction force control unit 26 controls the reaction force motor 3 so that the steering reaction force imparted to the steering wheel St corresponds to the final target steering reaction force Tt using the final target steering reaction force Tt as an input.

The following is an explanation of specific operations of the SBW controller 20. The following operations start Once an ignition switch of the vehicle C is turned on, for example, and the operations are performed with a predetermined period. First, the SBW controller 20 reads the turning angle δ, the steering angle θ, the velocity V and the tire lateral force Fy from the turning angle sensor 9, the steering angle sensor 8, the vehicle speed sensor 10 and the tire lateral force sensor 11, respectively.

Figure 3:
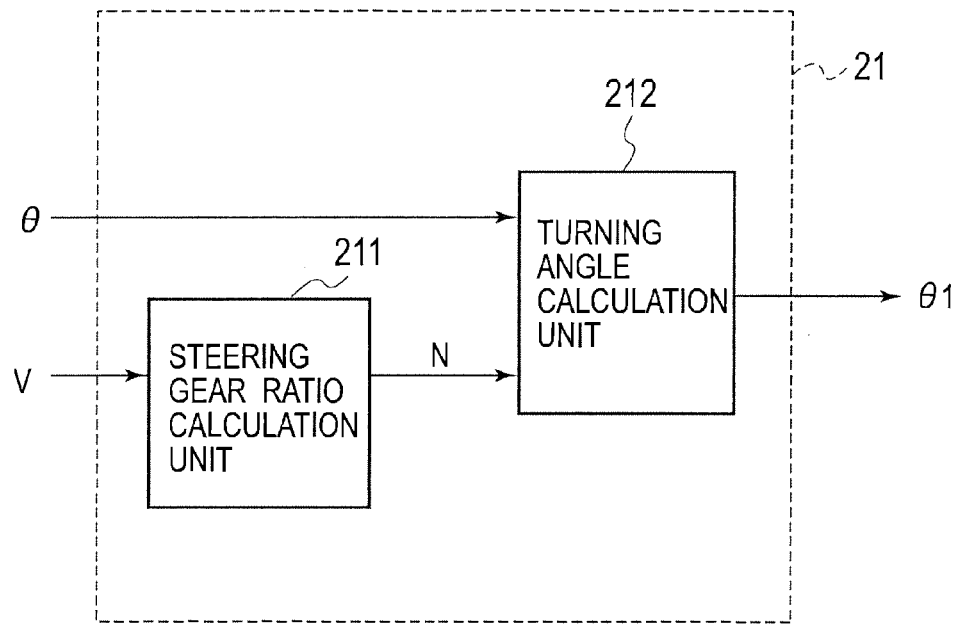
FIG. 3 is a block diagram showing a constitution of a first target turning angle calculation unit 21.

FIG. 3 is a block diagram showing a constitution of the first target turning angle calculation unit 21. The first target turning angle calculation unit 21 includes a steering gear ratio calculation unit 211 and a turning angle calculation unit 212.

Figure 4:
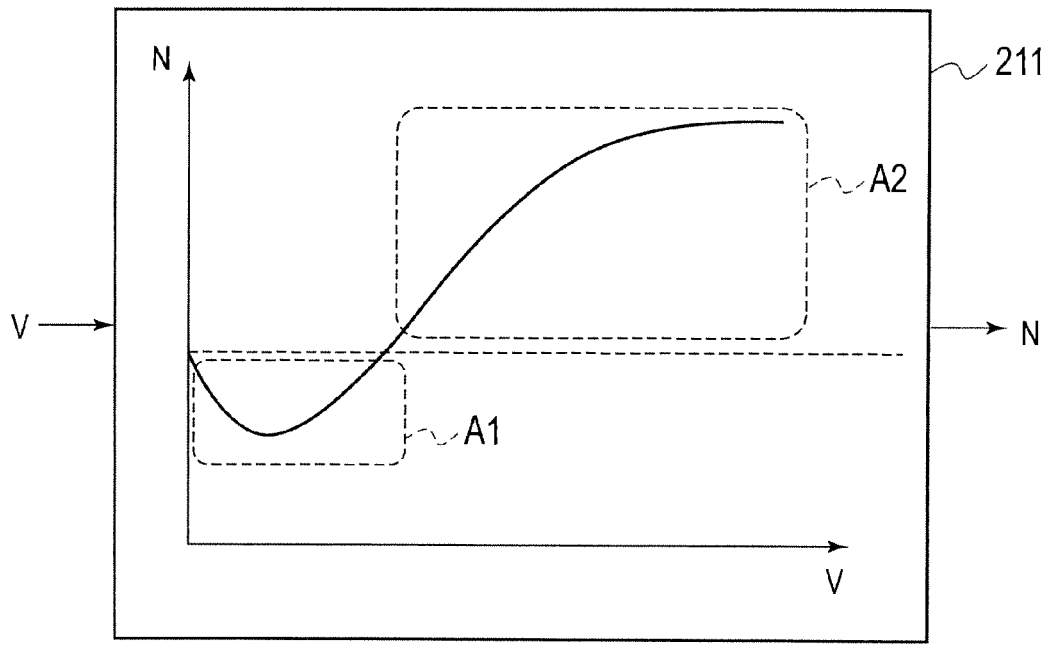
FIG. 4 is a block diagram showing a constitution of a steering gear ratio calculation unit 211.

The steering gear ratio calculation unit 211 calculates a steering gear ratio N based on the velocity V as shown in FIG. 4. The steering gear ratio N has a mutual relation with the velocity V. The steering gear ratio N is set to a small value in a low-speed area (A1) in which the velocity V is low so as to get a quick steering response, and set to a large value in a high-speed area (A2) in which the velocity is high so as to get a slow steering response. The relationship between the steering gear ratio N and the velocity V is preliminarily determined through tests and simulations. The steering gear ratio calculation unit 211 stores a map to define the above-mentioned relationship, and outputs the steering gear ratio N according to the velocity V to the turning angle calculation unit 212.

In the present embodiment, the steering gear ratio N is variable according to the velocity V in order to vary the steering response according to the velocity V as described above, but the steering gear ratio N is not limited to this condition. If the steering response is not necessarily varied according to the velocity V, the steering gear ratio calculation unit 211 may output a certain predetermined (constant) steering gear ratio N, for example. In such a case, the velocity V is not necessarily input to the steering gear ratio calculation unit 211.

The turning angle calculation unit 211 calculates the first target turning angle θ1 based on the steering angle θ and the steering gear ratio N, as shown in the following formula.

$$\theta 1 = N \cdot \theta \quad \text{[Math 1]}$$

As can be seen from the mathematical formula, the first target turning angle θ1 is calculated by integration of the steering gear ratio N into the steering angle θ.

Figure 5:
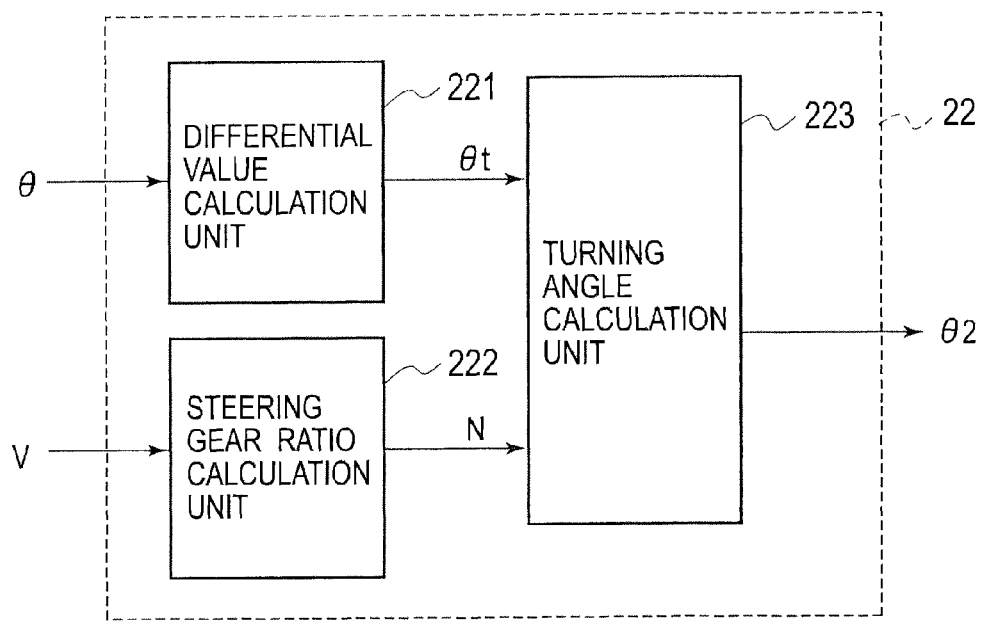
FIG. 5 is a block diagram showing a constitution of a second target turning angle calculation unit 22.

FIG. 5 is a block diagram showing a constitution of the second target turning angle calculation unit 22. The second target turning angle calculation unit 22 includes a differential value calculation unit 221, a steering gear ratio calculation unit 222 and a turning angle calculation unit 223.

The differential value calculation unit 221 performs time differentiation of the steering angle θ, so as to calculate a steering angular velocity θt (steering angular velocity detection means). The calculated steering angular velocity θt is output to the turning angle calculation means 223. The steering gear ratio calculation unit 222 calculates the steering gear ratio N based on the velocity V in a similar manner to the differential value calculation unit 221 described above. The calculated steering gear ratio N is output to the turning angle calculation unit 223.

The turning angle calculation unit 223 calculates the second target turning angle θ2 based on the steering angular velocity θt and the steering gear ratio N, as shown in the following formula.

$$\theta 2 = N \cdot (K1 \cdot \theta t) \quad \text{[Math 2]}$$

In the mathematical formula, K1 represents a proportional constant, of which an optimal value is preliminarily set through tests and simulations. As can be seen from the mathematical formula, the second target turning angle θ2 is calculated by integration of the steering gear ratio N into an integrated value of the steering angular velocity θt and the proportional constant K1.

Figure 6:
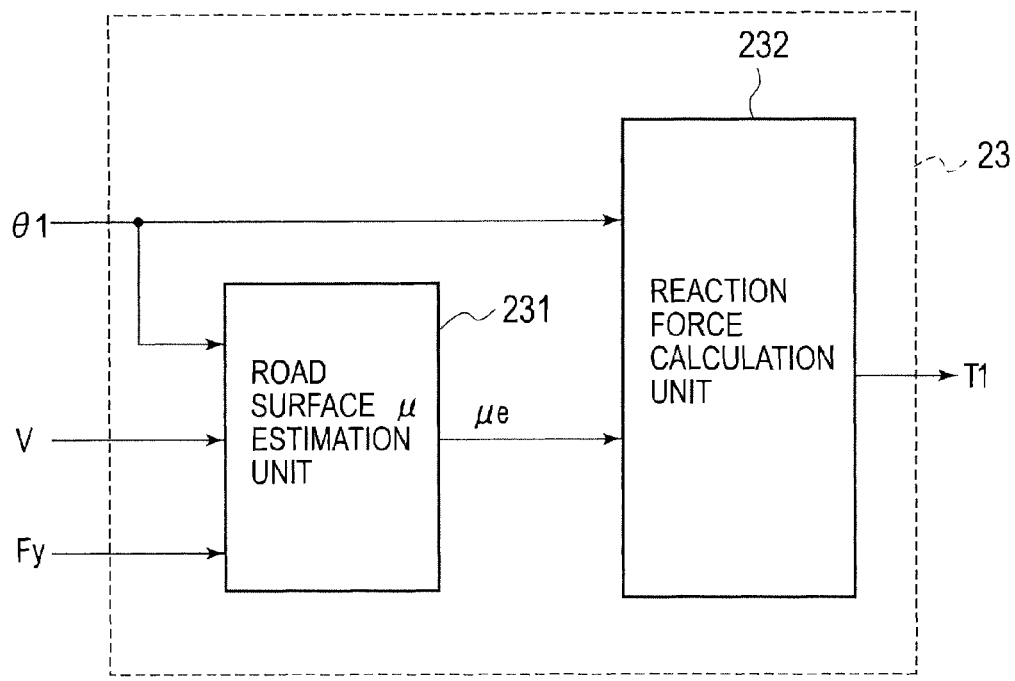
FIG. 6 is a block diagram showing a constitution of a first target steering reaction force calculation unit 23.

FIG. 6 is a block diagram showing a constitution of the first target steering reaction force calculation unit 23. The first target steering reaction force calculation unit 23 includes a road surface μ estimation unit 231 and a reaction force calculation unit 232.

Figure 7:
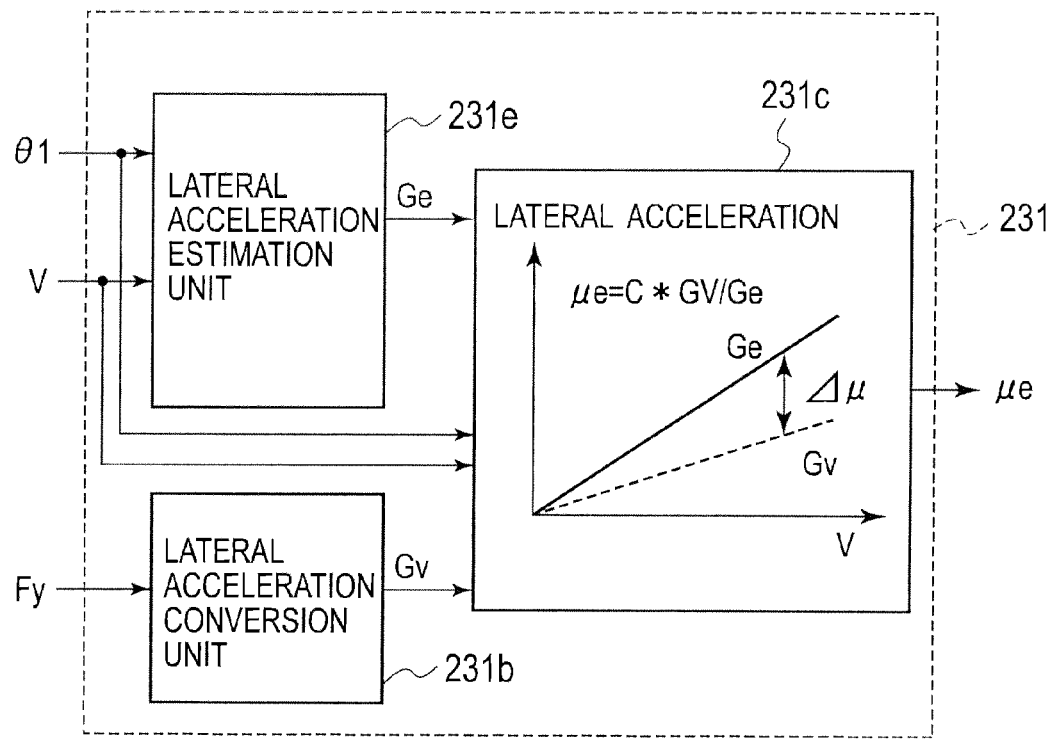
FIG. 7 is a block diagram showing a constitution of a road surface μ estimation unit 231.
Figure 8:
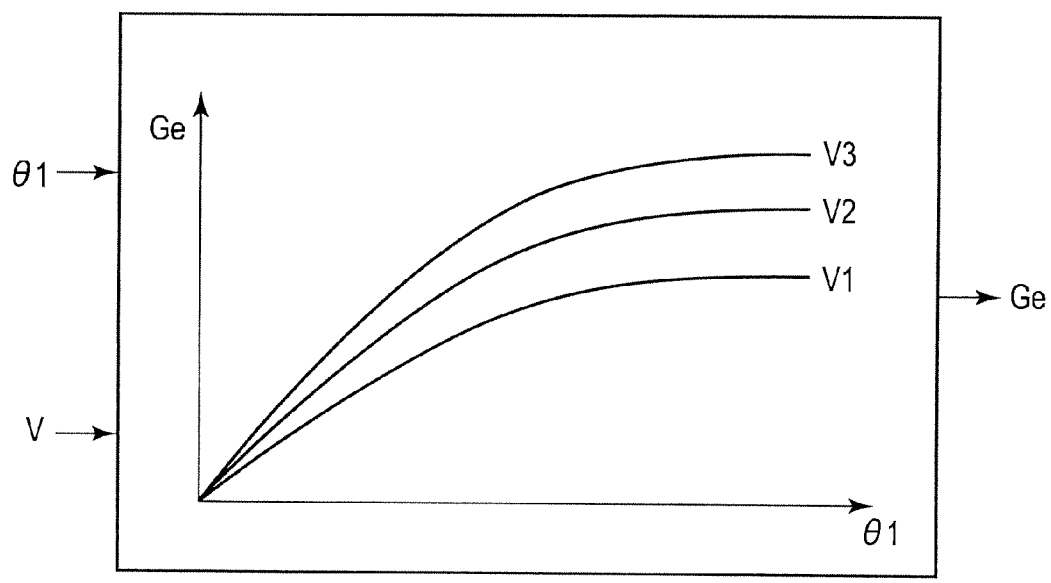
FIG. 8 is an explanatory diagram showing an arithmetic map of lateral acceleration Ge.

The road surface μ estimation unit 231 calculates a road surface μ estimation value μe that is an estimation value of a road surface friction coefficient (hereinafter, referred to as a "road surface μ"), based on the first target turning angle θ1, the velocity V and the tire lateral force Fy (road surface friction coefficient estimation means). Specifically, as shown in FIG. 7, the road surface μ estimation unit 231 includes a lateral acceleration estimation unit 231a, a lateral acceleration conversion unit 231b and a μ estimation unit 231c.

The lateral acceleration estimation unit 231a estimates lateral acceleration Ge (hereinafter, referred to as "estimation lateral acceleration Ge") caused at a vehicle body, based on the first target turning angle θ1 and the velocity V. The estimation lateral acceleration Ge tends to have a larger value, as the first target turning angle θ1 is larger and as the velocity V is larger (V1<V2<V3). The relationship between the lateral acceleration Ge, and the first target turning angle θ1 and the velocity V is preliminarily set through tests and simulations under the condition in which the road surface μ is defined as a road surface μ in a common dried road surface, for example. The lateral acceleration estimation unit 231a stores a map to define the relationship between the lateral acceleration Ge and the first target turning angle θ1 applied to each of the various velocities V, and calculates the estimation lateral acceleration Ge according to the first target turning angle θ1 and the velocity V. When the estimation lateral acceleration Ge is calculated with regard to the velocities V that are not defined by maps, the lateral acceleration estimation unit 231a preferably performs linear interpolation based on the existing maps. The estimation lateral acceleration Ge is output to the μ estimation unit 231c.

The lateral acceleration conversion unit 231b calculates lateral acceleration Gv (hereinafter, referred to as "conversion lateral acceleration Gv") caused at a vehicle body converted from the tire lateral force Fy. Specifically, the lateral acceleration conversion unit 231b calculates the conversion lateral acceleration Gv based on the following formula.

$$Gv = Fy \times \frac{lr}{(lf+lr) \cdot m} \times C1 \qquad \text{[Math 3]}$$

In the mathematical formula, m represents a vehicle mass, lf represents a distance between a center of gravity and a front wheel axis, and lr represents a distance between a center of gravity and a rear wheel axis. In addition, C1 represents a correction coefficient, and an optimal value is preliminarily set through tests and simulations. The conversion lateral acceleration Gv is determined according to vehicle data and the tire lateral force Fy, and tends to have a larger value, as the tire lateral force Fy is larger. The conversion lateral acceleration Gv is output to the μ estimation unit 231c.

The μ estimation unit 231c calculates the road surface μ estimation value μe based on the comparison of the estimation lateral acceleration Ge with the conversion lateral acceleration Gv according to the following relational expression.

$$\mu e = C2 \times \frac{Gv}{Ge} \qquad \text{[Math 4]}$$

In the mathematical formula, C2 represents a correction coefficient, and an optimal value thereof is preliminarily set through tests and simulations. The road surface μ estimation value μe is calculated according to the mathematical formula based on the condition that a difference (Δμ) between an assumed road surface μ in an estimation calculation of lateral acceleration (for example, a road surface μ in a common dried road surface) and an actual road surface μ corresponds to a difference of lateral acceleration between the estimation lateral acceleration Ge and the conversion lateral acceleration Gv. The road surface μ estimation value μe is output to the reaction force calculation unit 232.

The reaction force calculation unit 232 calculates the first target steering reaction force T1 based on the road surface μ estimation value μe and the first target turning angle θ (reaction force calculation means). Specifically, the reaction force calculation unit 232 calculates the first target steering reaction force T1 based on the following formula.

$$T1 = P1 \cdot \mu e \cdot \theta 1 \qquad \text{[Math 5]}$$

In the mathematical formula, P1 represents a proportional constant. As can be seen from the mathematical formula, when the road surface μ estimation value μe is small, the first target steering reaction force T1 is proportionally set to a smaller value compared with the case in which the road surface μ estimation value μe is high.

Figure 9:
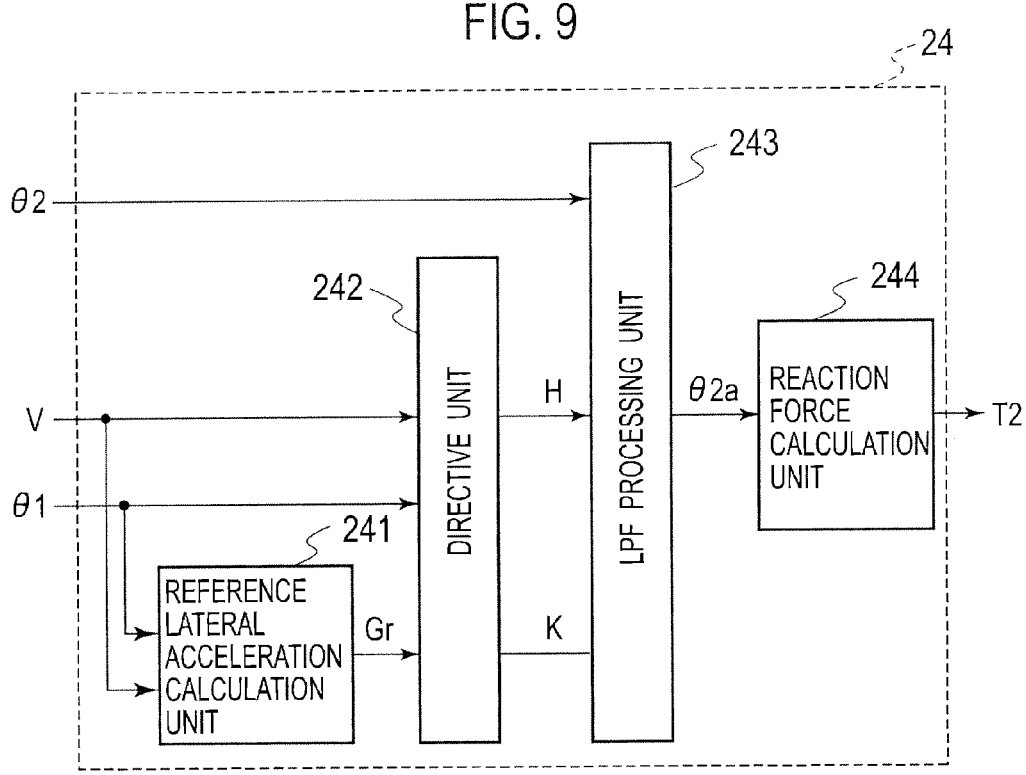
FIG. 9 is a block diagram showing a constitution of a second target steering reaction force calculation unit 24.

FIG. 9 is a block diagram showing a constitution of the second target steering reaction force calculation unit 24. The second target steering reaction force calculation unit 24 includes a reference lateral acceleration calculation unit 241, a directive unit 242, an LPF processing unit 243 and a reaction force calculation unit 244.

The reference lateral acceleration calculation unit 241 calculates reference lateral acceleration Gr that is an estimation value of lateral acceleration of the vehicle C. Specifically, the reference lateral acceleration calculation unit 241 calculates the reference lateral acceleration Gr based on the following formula.

$$Vy = \phi \cdot V \qquad \text{[Math 6]}$$

In the mathematical formula, φ represents a reference yaw rate, and is calculated according to the following formula.

$$\varphi = \left( \frac{1}{1 - \{m \cdot V^2 \cdot (lf \cdot Kf - lr \cdot Kr)/(2 \cdot l^2 \cdot Kf \cdot Kr)\}} \right) \frac{V \cdot \theta 1}{(lf + lr) \cdot N} \qquad \text{[Math 7]}$$

In the formula, Kf represents a cornering power of the tires of the front wheels, Kr represents a cornering power of the tires of the rear wheels, and 1 represents a wheel base. The calculated reference lateral acceleration Gr is outputs to the directive unit 242. Note that, the reference lateral acceleration calculation unit 241 may calculate the reference lateral acceleration Gr by a map calculation in a similar manner to the lateral acceleration estimation unit 231a described above.

The directive unit 242 sets gain K and cut-off frequency H based on the velocity V, the reference lateral acceleration Gr and the first target turning angle θ1 (frequency setting means). The gain K and the cut-off frequency H are parameters affecting filter processing (low-pass filter processing) performed to the second target turning angle θ2 by the LPF processing unit 243. Namely, according to the configuration of the gain K and the cut-off frequency H, an influence degree of the second target turning angle θ2 reflected on the second target steering reaction force T2 can be controlled. In the present embodiment, the gain K and the cut-off frequency H are configured in view of the velocity V, the reference lateral acceleration Gr and the first target turning angle θ1. Accordingly, the second target steering reaction force T2 is calculated based on a value obtained by a variation restriction of the second target steering reaction force T2 (second turning angle correction value θ2a described below), so that the variation of the second target steering reaction force T2 corresponding to a transient variation of the second target turning angle θ2 is suppressed.

Figure 10:
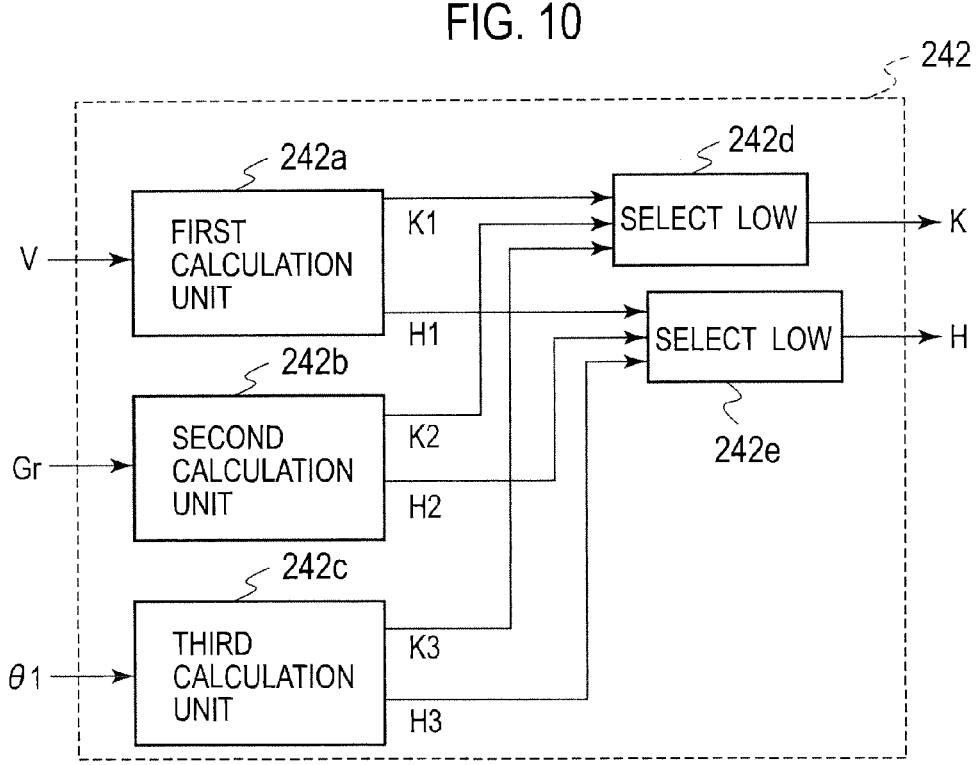
FIG. 10 is a block diagram showing a constitution of a directive unit 242.

As shown in FIG. 10, the directive unit 242 includes first to third calculation units 242a to 242c, and first and second minimum value selecting units 242d and 242e.

Figure 11:
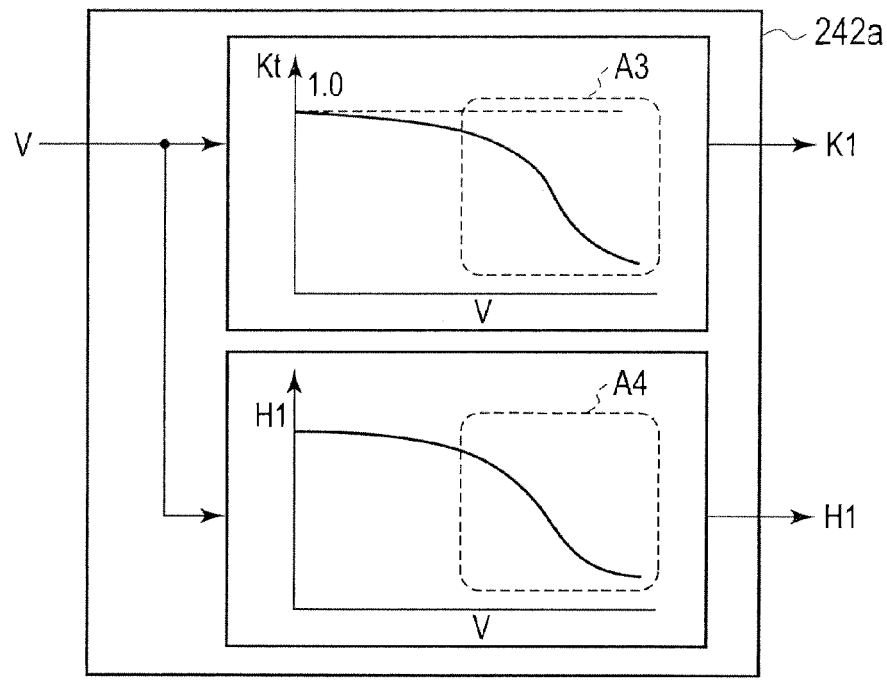

FIG. 11 is a block diagram showing a constitution of the first calculation unit 242a. The first calculation unit 242a calculates, based on the velocity V, gain K1 and cut-off frequency H1 depending on the velocity V. As shown in the areas A3 and A4 in the figure, the gain K1 and the cut-off frequency H1 tend to have smaller values, as the velocity V is larger, in order to prevent inhibition of driver steering by suppressing a variation of a steering reaction force associated with steering at the time of high-speed driving. The relationship between the gain K1 and the cut-off frequency H1 with respect to the velocity V is preliminarily set through tests and simulations. The first calculation unit 242a stores such a relationship as a map. The gain K1 depending on the velocity V is output to the first minimum value selecting unit 242d, and the cut-off frequency H1 depending on the velocity V is output to the second minimum value selecting unit 242e.

Figure 12:
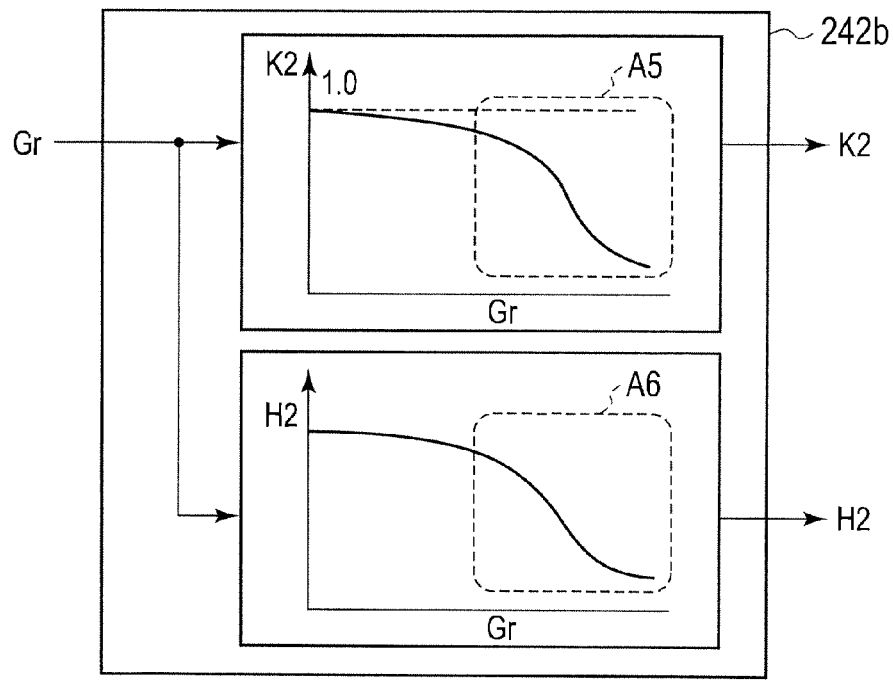
FIG. 12 is a block diagram showing a constitution of a second calculation unit 242b.

FIG. 12 is a block diagram showing a constitution of the second calculation unit 242b. The second calculation unit 242b calculates, based on the reference lateral acceleration Gr, gain K2 and cut-off frequency H2 depending on the reference lateral acceleration Gr. As shown in the areas A5 and A6 in the figure, the gain K2 and the cut-off frequency H2 tend to have smaller values, as the reference lateral acceleration Gr is larger, in order to achieve a stable feeling of steering of a driver by suppressing a variation of a steering reaction force caused by steering with a minor correction during turning driving in which high lateral acceleration affects. The relationship between the gain K2 and the cut-off frequency H2 with respect to the reference lateral acceleration Gr is preliminarily set through tests and simulations. The second calculation unit 242b stores such a relationship as a map. The gain K2 depending on the reference lateral acceleration Gr is output to the first minimum value selecting unit 242d, and the cut-off frequency H1 depending on the reference lateral acceleration Gr is output to the second minimum value selecting unit 242e.

Figure 13:
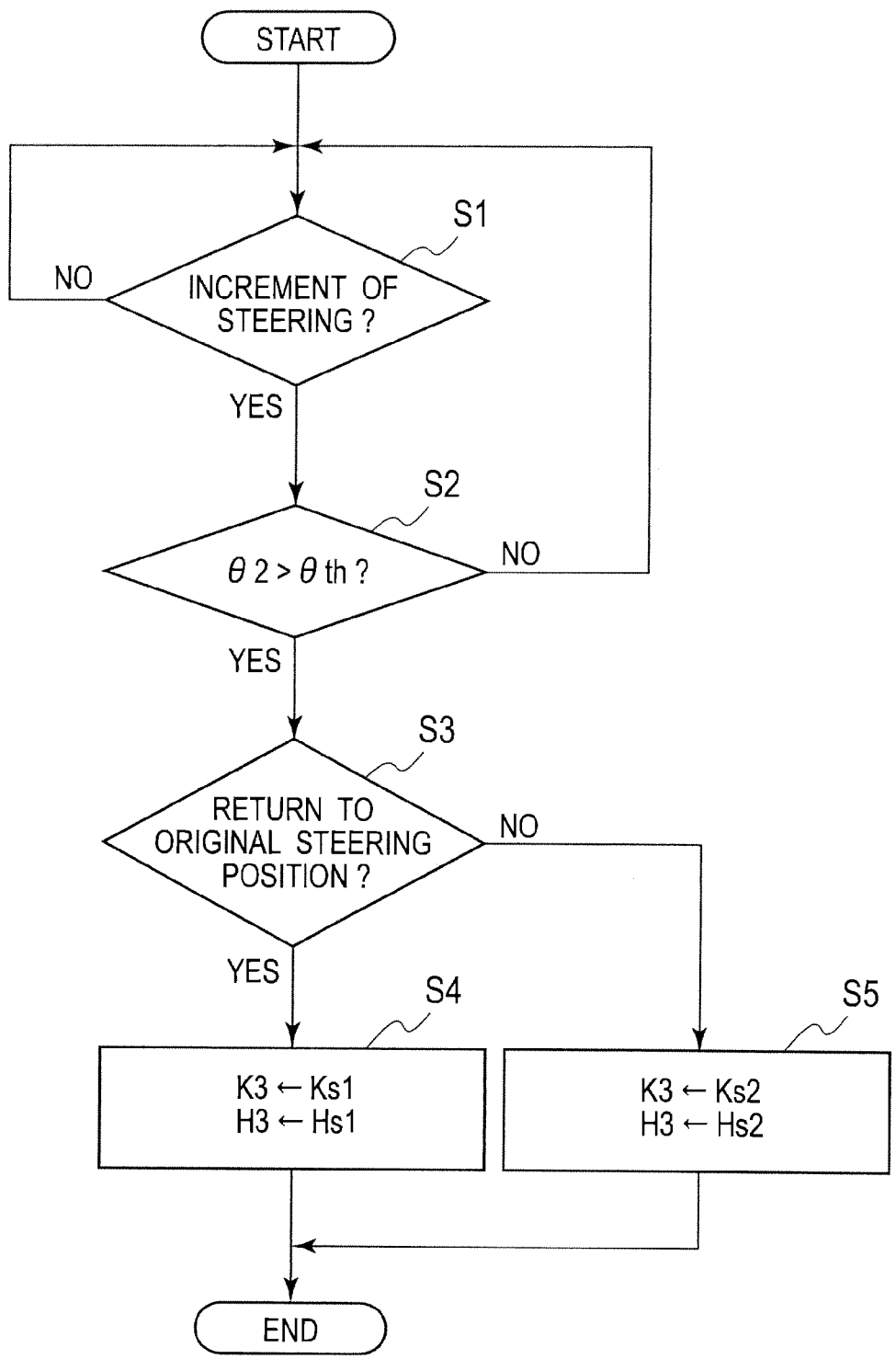
FIG. 13 is a flow chart showing a determination process of gain K3 and cut-off frequency H3 according to a third calculation unit 242c.

The third calculation unit 242c calculates, based on the first target turning angle θ1, gain K3 and cut-off frequency H3 depending on the first target turning angle θ1. FIG. 13 is a flow chart showing a determination process of the gain K3 and the cut-off frequency H3 according to the third calculation unit 242c.

First, in the step 1 (S1), the third calculation unit 242c determines whether or not an increment of steering is made. When the determination is positive in the step 1, that is, when the increment of steering is made, the step proceeds to the step 2 (S2). When the determination is negative in the step 1, that is, when the increment of steering is not made, the third calculation unit 242c returns to the determination of the step 1.

In the step 2, the third calculation unit 242c determines whether or not the second target turning angle θ2 is larger than a predetermined threshold value θth, that is, whether or not a large steering movement is made, upon referring the present second target turning angle θ2. When the determination is positive in the step 2, that is, when the second target turning angle θ2 is larger than the predetermined threshold value θth, the step proceeds to the step 3 (S3). When the determination is negative in the step 2, that is, when the second target turning angle θ2 is the predetermined threshold value θth or less, the third calculation unit 242c returns to the determination of the step 1.

In the step 3, the third calculation unit 242c determines whether or not a return to the original steering position is made. When the determination is positive in the step 3, that is, when the return to the original steering position is made, the step proceeds to the step 4 (S4). When the determination is negative in the step 3, that is, when the return to the original steering position is not made (for example, when keeping steering), the step proceeds to the step 5 (S5).

In the step 4, the third calculation unit 242c sets the gain K3 to a first predetermined gain Ks1, and sets the cut-off frequency H3 to a first predetermined frequency Hs1. In the step 5 (S5), the third calculation unit 242c sets the gain K3 to a second predetermined gain Ks2, and sets the cut-off frequency H3 to a second predetermined frequency Hs2. The gain K3 depending on the first target turning angle θ is output to the first minimum value selecting unit 242d, and the cut-off frequency H3 depending on the first target turning angle θ is output to the second minimum value selecting unit 242e.

The second predetermined gain Ks2 is set to a smaller value than the first predetermined gain Ks1, and the second predetermined frequency Hs2 is set to a smaller value than the first predetermined frequency Hs1. In the case where the return to the original steering position is not made, for example, when keeping steering, the second predetermined gain Ks2 and the second predetermined frequency Hs2 are applied, so as to suppress a reaction force variation by steering. In addition, when the return to the original steering position is made, the first predetermined gain Ks1 and the first predetermined frequency Hs1 are applied, so as to prevent a feeling of a response delay of a user such as a case where a reduction in steering reaction force does not start even though a sign reversal of the steering angular velocity θ is made. Each optimal value of the parameters Ks1, Ks2, Hs1 and Hs2 is preliminarily set through tests and simulations.

The first minimum value selecting unit 242d compares the respective input gains K1 to K3, so as to output a minimum value as a final gain K to the LPF processing unit 243. The second minimum value selecting unit 242e compares the respective input cut-off frequencies H1 to H3, so as to output a minimum value as a final cut-off frequency H to the LPF processing unit 243. Therefore, at the time of high-speed driving, for example, the gain K1 and the cut-off frequency H1 depending on the velocity are set as the final gain K and cut-off frequency H, and at the time of turning driving in which high lateral acceleration affects, the gain K2 and the cut-off frequency H2 depending on the reference lateral acceleration Gr are set as the final gain K and cut-off frequency H. In the case of steering with stepping input, the gain K3 and the cut-off frequency H2 depending on the first target turning angle θ is set as the final gain K and cut-off frequency H.

The LPF processing unit 243 performs low-pass filter processing to reduce a high-frequency component with respect to the second target turning angle θ2 based on the gain K and the cut-off frequency H, so as to calculate a correction value (hereinafter, referred to as a "second turning angle correction value") θ2a of the second target turning angle θ2 (low-pass filter processing means). Specifically, the LPF processing unit 243 calculates the second turning angle correction value θ2a based on the following formula.

$$\theta 2a = \theta 2 \cdot K \frac{1}{1 + s \cdot \tau} \qquad [\text{Math 8}]$$

$$\tau = \frac{1}{2 \cdot \pi \cdot H} \qquad [\text{Math 9}]$$

In the formula, τ represents a time constant of a filter, and s represents a Laplace operator. The calculated second turning angle correction value θ2a is output to the reaction force calculation unit 244.

The reaction force calculation unit 244 calculates the second target steering reaction force T2 based on the input second turning angle correction value θ2a. Specifically, the reaction force calculation unit 244 calculates the second target steering reaction force T2 based on the following formula. In the formula, P2 represents a proportional constant.

$$T2 = P \cdot \theta 2a \qquad [\text{Math 10}]$$

In the steering apparatus for a vehicle 1 according to the present embodiment, the reaction force control unit 26 controls the reaction force motor 3 based on the final target steering reaction force Tt in which the first target steering reaction force T1 and the second target steering reaction force T2 are added. In this case, the second target steering reaction force calculation unit 24 calculates the second target steering reaction force T2 based on a value obtained by a variation restriction of the second target turning angle θ2 (second turning angle correction value θ2a).

Figure 14:
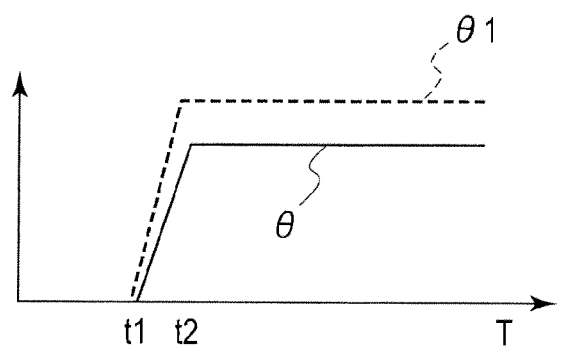
Figure 14:
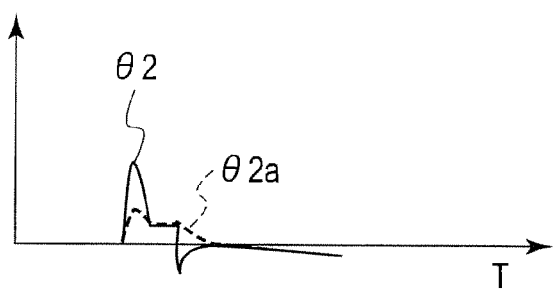
Figure 14:
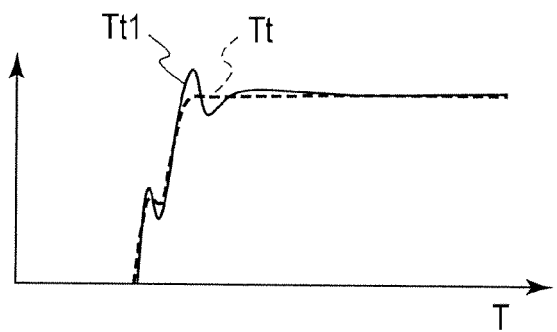

FIG. 14 is an explanatory diagram showing a comparison of cases with control and without control according to the present embodiment. FIG. 14(a) shows a transition pattern between a typical steering input (steering angle θ) and the corresponding first target turning angle θ1 (in the figure, "T" represents time). FIG. 14(b) shows a transition pattern between the second target turning angle θ2 corresponding to the input of FIG. 14(a) and the second turning angle correction value θ2a. FIG. 14(c) shows a transition pattern between the final target steering reaction force Tt calculated from the second turning angle correction value θ2a shown in FIG. 14(b) and the final target steering reaction force Tt1 calculated from the second target turning angle θ2 not corrected.

At the beginning of steering (time t1), due to the effect of low-pass filter processing by the LPF processing unit 243, a rapid variation is prevented in the second turning angle correction value θ2a, compared with the second target turning angle θ2 that is a value before correction. Therefore, even if the second target turning angle θ2 is greatly changed, a variation reflected in the second target steering reaction force T2 and further in the final target steering reaction force Tt is suppressed. Thus, a case where a large variation of a reaction force is caused at the start of steering and at the end of steering can be prevented. Accordingly, the variation of the steering reaction force generated by steering control by a driver after starting steering and after stopping steering can be appropriately transmitted to the driver, thereby reducing a feeling of strangeness of the driver.

Although the second target turning angle θ2 is a parameter to be referred for turning angle control and steering reaction force control, a means for suppressing the variation of the second target turning angle θ2 is not applied to the turning angle control, different from the steering reaction force control, since the variation of the second target turning angle θ2 is preferably reflected directly on the turning angle control in view of the steering response. Namely, according to the present embodiment, the constitution to suppress the variation of the second target turning angle θ2 is applied only to the steering reaction force control. Therefore, the high steering response and the reduction of a feeling of strangeness of a driver caused by the large variation of the steering reaction force at the start of steering and at the end of steering are both achieved.

In the present embodiment, the first target steering reaction force calculation unit 23 calculates the first target steering reaction force T1 based on the road surface μ estimation value μe and the first target turning angle θ1. Therefore, when the road surface μ estimation value μe is small, the first target steering reaction force T1 is proportionally set to a smaller value compared with the case in which the road surface μ estimation value μe is high. As a result, a road surface condition can be transmitted to a driver as a steering reaction force, so that the driver can perform a steering operation according to the road surface condition.

The second target steering reaction force calculation unit 24 according to the present embodiment includes the LPF processing unit 243 for performing filter processing to remove a high-frequency component with respect to the second target turning angle θ2. According to such a constitution, low-pass filter processing is performed with respect to the second target turning angle θ2, so as to obtain the second turning angle correction value θ2a as a value obtained by a variation restriction of the second target turning angle θ2.

The effect of suppressing the variation of the steering reaction force associated with such a variation of the second target turning angle θ2 becomes larger, as the velocity V is higher, as can be understood from the gain K1 and the cut-off frequency H1 depending on the velocity V. Therefore, the variation of the steering reaction force associated with steering during high-speed driving can be suppressed, so as to prevent inhibition of driver steering during high-speed driving in which relatively high accuracy of steering by a driver is required.

The effect of suppressing the variation of the steering reaction force associated with such a variation of the second target turning angle θ2 becomes larger, as the reference lateral acceleration Gr is higher, as can be understood from the gain K2 and the cut-off frequency H2 depending on the reference lateral acceleration Gr. During turning driving in which high lateral acceleration affects, a driver controls a vehicle behavior by steering with a minor correction to provide torque opposing the steering reaction force. Therefore, the variation of the steering reaction force is suppressed by the calculation of the gain K2 and the cut-off frequency H2 as described above. Accordingly, a stable feeling of steering of the driver can be achieved.

The effect of suppressing the variation of the steering reaction force associated with such a variation of the second target turning angle θ2 becomes larger at the start of keeping steering (time t2) (negative determination in the step 4), as can be understood from the gain K3 and the cut-off frequency H3 depending on the first target turning angle θ1. Therefore, a case where the steering reaction force is lost during keeping steering can be prevented.

Figure 15:
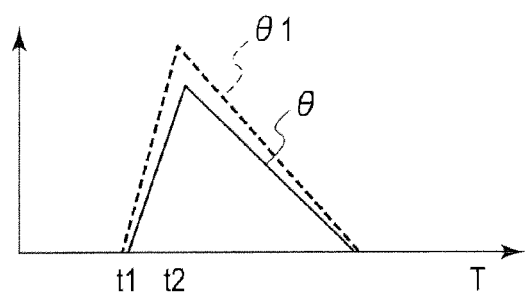
FIG. 15(a) is an explanatory diagram showing a comparison of cases with control and without control according to a first embodiment, and showing a transition pattern between a typical steering input (steering angle θ) and a corresponding first target turning angle θ1.
FIG. 15(b) is a diagram showing a transition pattern between a second target turning angle θ2 corresponding to the input of FIG. 15(a) and second turning angle correction values θ2a and θ2a'.
FIG. 15(c) is a diagram showing a transition pattern between final target steering reaction forces Tt and Tt' calculated from the second turning angle correction value θ2a shown in FIG. 15(b) and a final target steering reaction force Tt1 calculated from the second target turning angle θ2 not corrected.
Figure 15:
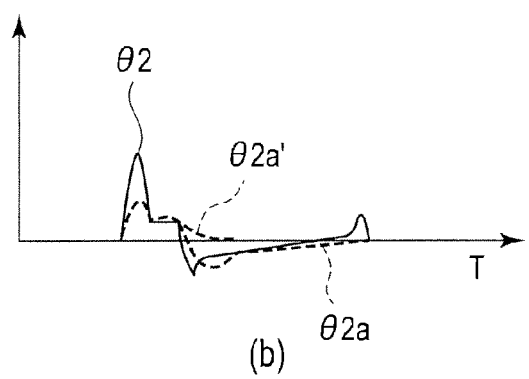
Figure 15:
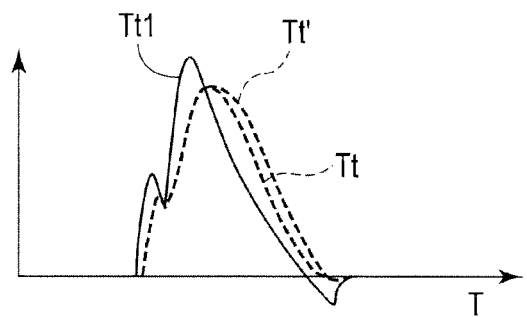

As shown in FIG. 15, when a return to the original steering position is made after an increment of steering is made, the effect of suppressing the variation of the steering reaction force associated with the variation of the second target turning angle θ2 described above becomes smaller (positive determination in the step 4), compared with the case where the return to the original steering position is not made. As a result, a case where a reduction in steering reaction force does not start even though a sign reversal of the steering angular velocity θ is made, in other words, a case where the variation of the steering reaction force is delayed, can be prevented.

FIG. 15 is an explanatory diagram showing a comparison of cases with control and without control according to the present embodiment. FIG. 15(a) shows a transition pattern between a typical steering input (steering angle θ) and the corresponding first target turning angle θ1 (in the figure, "T" represents time). FIG. 15(b) shows a transition pattern between the second target turning angle θ2 corresponding to the input of FIG. 15(a) and the second turning angle correction values θ2a and θ2a'. In this case, θ2a is the second turning angle correction value when the gain K3 and the cut-off frequency H3 are set to the first predetermined gain Ks1 and the first predetermined cut-off frequency Hs1 when the return to the original steering position is made. θ2a' is the second turning angle correction value when the gain K3 and the cut-off frequency H3 are kept being set to the second predetermined gain Ks2 and the second predetermined cut-off frequency Hs2 when the return to the original steering position is made. FIG. 15(c) shows a transition pattern between the final target steering reaction forces Tt and Tt' calculated from the second turning angle correction value θ2a shown in FIG. 15(b) and the final target steering reaction force Tt1 calculated from the second target turning angle θ2 not corrected. In this case, Tt is the final target steering reaction force when the gain K3 and the cut-off frequency H3 are set to the first predetermined gain Ks1 and the first predetermined cut-off frequency Hs1 when the return to the original steering position is made. Tt' is the final target steering reaction force when the gain K3 and the cut-off frequency H3 are kept being set to the second predetermined gain Ks2 and the second predetermined cut-off frequency Hs2 when the return to the original steering position is made.

According to the present embodiment described above, the respective minimum values of the gains K1 to K3 and the cut-off frequencies H1 to H3 depending on the velocity V, the reference lateral acceleration Gr and the first target turning angle θ1 are selected so as to be input into the LPF processing unit 243. Therefore, the effect of suppressing the variation of the steering reaction force associated with the variation of the second target turning angle θ2 according to the most strongly affecting element can be obtained. Accordingly, a feeling of strangeness of a driver can be prevented.

According to the present embodiment described above, the respective gains K1 to K3 and cut-off frequencies H1 to H3 depending on the velocity V, the reference lateral acceleration Gr and the first target turning angle θ1 are set in the directive unit 242. However, any one of the elements may be independently set in the directive unit 242, or two of the elements may be set in combination, or other elements may be added to the directive unit 242.

(Second Embodiment)

Hereinafter, the steering apparatus for as vehicle 1 according to the second embodiment of the present invention will be explained. The steering apparatus for a vehicle 1 according to the second embodiment differs from that according to the first embodiment in calculating means of the second target turning angle θ2. The constitution and control operations of the steering apparatus for a vehicle 1 according to the present embodiment are substantially similar to those according to the first embodiment, and refer to the drawings and the explanations thereof described in the first embodiment. The differences from the first embodiment will be mainly explained below.

Figure 16:
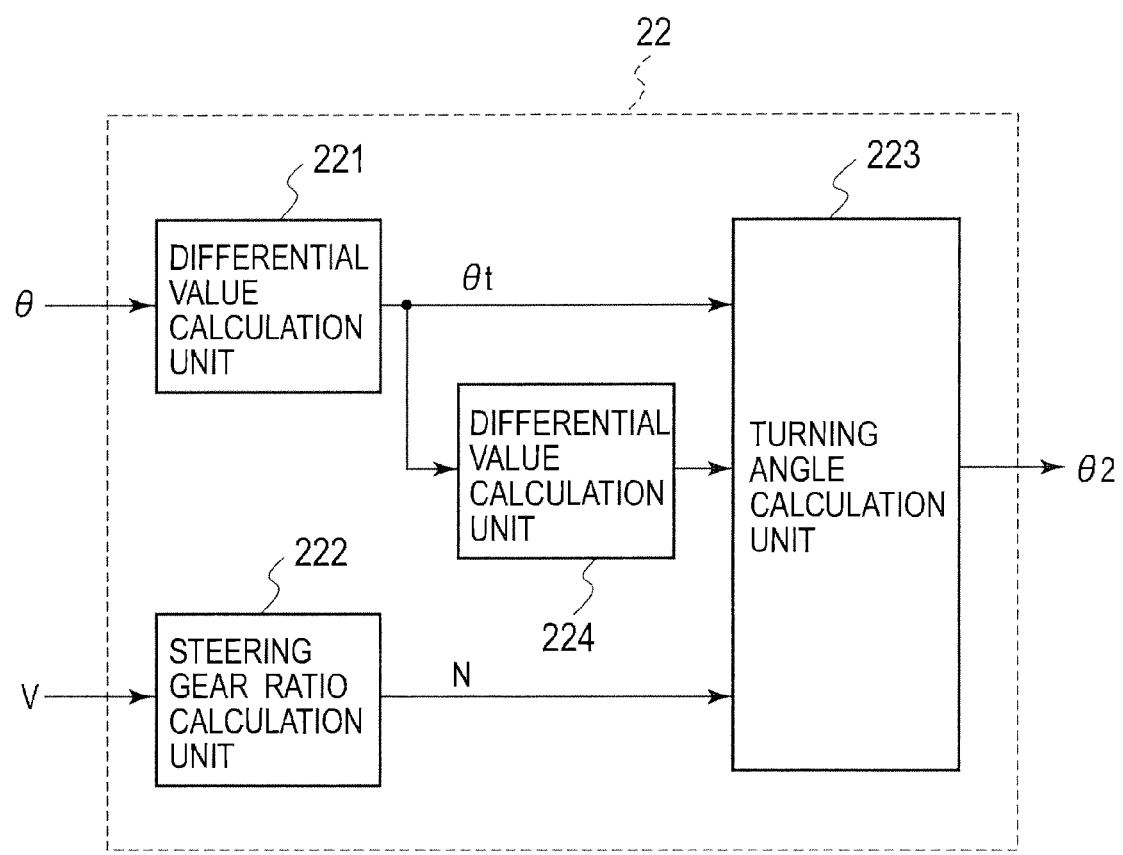
FIG. 16 is a block diagram showing a constitution of a second target turning angle calculation unit 22 according to a second embodiment.

FIG. 16 is a block diagram showing a constitution of the second target turning angle calculation unit 22 according to the present embodiment. The second target turning angle calculation unit 22 includes a first differential value calculation unit 221, a second differential value calculation unit 224, the steering gear ratio calculation unit 222, and the turning angle calculation unit 223.

The first differential value calculation unit 221 performs time differentiation of the steering angle θ, so as to calculate the steering angular velocity θt. The calculated steering angular velocity θt is output to the second differential value calculation unit 224 and the turning angle calculation means 223. The steering gear ratio calculation unit 222 calculates the steering gear ratio N in a similar manner to the first embodiment. The calculated steering gear ratio N is output to the turning angle calculation unit 223.

The second differential value calculation unit 221 performs time differentiation of the steering angular velocity θt, so as to calculate the steering angular velocity θt2 (steering angular velocity detection means). The calculated steering angular velocity θt2 is output to the turning angle calculation unit 223.

The turning angle calculation unit 223 calculates the second target turning angle θ2 based on the steering angular velocity θt, the steering angular acceleration θt2 and the steering gear ratio N, according to the following formula.

$$\theta 2 = N \cdot (K1 \cdot \theta t + K2 \cdot \theta t2) \quad \text{[Math 11]}$$

In the mathematical formula, K1 and K2 represent proportional constants, and optimal values thereof are preliminarily set through tests and simulations. As can be understood from the mathematical formula, the second target turning angle θ2 is calculated by integration of the steering gear ratio N into a sum of an integrated value of the steering angular velocity θt and the proportional constant K1 and an integrated value of the steering angular acceleration θt2 and the proportional constant K2.

According to the present embodiment, the second target turning angle θ2 is calculated based on the steering angular velocity θt and the steering angular acceleration θt2. Due to such a configuration, a rate of rise of the second target turning angle θ2 (rate of increase of the second target turning angle θ2 at the beginning of steering) increases in the case where rapid steering is made such as the case of emergency avoidance to avoid obstacles, compared with the case in which only the steering angular velocity θt calculates the second target turning angle θ2. Accordingly, a lack of the reaction force with respect to the rapid steering is relieved, so that an improvement of an operation performance of a driver at the beginning of steering can be achieved.

Although the steering apparatus for a vehicle according to the embodiments of the present invention has been described, the invention is not limited to the foregoing embodiments, and various modifications may be made within the scope of the invention.

REFERENCE SIGNS LIST

1 Steering apparatus for a vehicle
2 Steering shaft
3 Reaction force motor
4 Tie rod
5 Rack
6 Pinion shaft
7 Steering motor
8 Steering angle motor
9 Turning angle motor
10 Velocity sensor
11 Tire lateral force sensor
12 SBW controller
21 First target turning angle calculation unit
211 Steering gear ratio calculation unit 212 Turning angle calculation unit
22 Second target turning angle calculation unit
221 Differential value calculation unit
222 Steering gear ratio calculation unit
223 Turning angle calculation unit
23 First target steering reaction force calculation unit
231 Road surface μ estimation unit
231a Lateral acceleration estimation unit
231b Lateral acceleration conversion unit
231c μ estimation unit
232 Reaction force calculation unit
24 Second target steering reaction force calculation unit
241 Reference lateral acceleration calculation unit
242 Directive unit
242a First calculation unit
242b Second calculation unit
242c Third calculation unit
242d Minimum value selecting unit
242e Minimum value selecting unit
243 LPF processing unit
244 Reaction force calculation unit
25 Steering control unit
26 Reaction force control unit

The invention claimed is:

1. A steering apparatus for a vehicle, comprising:
a wheel drive unit configured to drive wheels of the vehicle, the wheel drive unit being mechanically disconnectable from a steering wheel configured to be operated by a driver;
a reaction force imparting unit configured to impart a steering reaction force to the steering wheel;
a turning angle detection unit configured to detect a turning angle of the wheels;
a steering angle detection unit configured to detect a steering angle as an operation amount of the steering wheel by the driver;
a steering angular velocity detection unit configured to detect a steering angular velocity as an operation velocity of the steering wheel by the driver;
a first target turning angle calculation unit configured to calculate a first target turning angle based on the detected steering angle;
a second target turning angle calculation unit configured to calculate a second target turning angle based on the detected steering angular velocity;
a first target steering reaction force calculation unit configured to calculate a first target steering reaction force based on the calculated first target turning angle;
a second target steering reaction force calculation unit configured to calculate a second target steering reaction force based on a value obtained by a variation restriction of the calculated second target turning angle;
a driven wheel control unit configured to control the wheel drive unit based on a final target turning angle obtained by an addition of the first target turning angle and the second target turning angle; and
a reaction force control unit configured to control the reaction force imparting unit based on a final target steering reaction force obtained by an addition of the first target steering reaction force and the second target steering reaction force.

2. The steering apparatus for a vehicle according to claim 1, wherein the second target steering reaction force calculation unit comprises a low-pass filter processing unit configured to perform filter processing for removing a high-frequency component with respect to the second target turning angle.

3. The steering apparatus for a vehicle according to claim 2, wherein the second target steering reaction force calculation unit further comprises a frequency setting unit configured to set a gain and a cut-off frequency to be set in the low-pass filter processing unit.

4. The steering apparatus for a vehicle according to claim 3, wherein the frequency setting unit is configured to set the gain and the cut-off frequency depending on a velocity of the vehicle such that the gain and the cut-off frequency are smaller as the velocity of the vehicle is higher.

5. The steering apparatus for a vehicle according to claim 3, wherein the frequency setting unit is configured to set the gain and the cut-off frequency depending on a lateral acceleration of the vehicle such that the gain and the cut-off frequency are smaller as the lateral acceleration of the vehicle is higher.

6. The steering apparatus for a vehicle according to claim 3, wherein the frequency setting unit is configured to set the gain and cut-off frequency depending on the first target turning angle such that, when the first target turning angle is not changed, the gain and the cut-off frequency are smaller compared with a case in which the first target turning angle is changed.

7. The steering apparatus for a vehicle according to claim 6, wherein the frequency setting unit is configured to set a minimum value of the gain and a minimum value of the cut-off frequency selected from a plurality of gains and cut-off frequencies, the gain and cut-off frequencies depending on a velocity of the vehicle, a lateral acceleration of the vehicle, and the first target turning angle.

8. The steering apparatus for a vehicle according to claim 1, further comprising:
a steering angular acceleration detection unit that detects a steering angular acceleration,
wherein the second target turning angle calculation unit is configured to calculate the second target turning angle based on the detected steering angular velocity and the steering angular acceleration.

9. The steering apparatus for a vehicle according to claim 1, further comprising:
a lateral force detection unit that detects a lateral force acting on tires of the wheels,
wherein the first target steering reaction force calculation unit comprises:
a road surface friction coefficient estimation unit configured to estimate a road surface friction coefficient based on the detected lateral force; and
a reaction force calculation unit configured to calculate the first target steering reaction force based on the estimated road surface friction coefficient and the calculated first target turning angle.

10. A steering apparatus for a vehicle, comprising:
a wheel drive unit configured to drive wheels of the vehicle, the wheel drive unit being mechanically disconnectable from a steering wheel operated by a driver;
a reaction force imparting unit configured to impart a steering reaction force to the steering wheel;
a turning angle detection unit configured to detect a turning angle of the wheels;
a steering angle detection unit configured to detect a steering angle as an operation amount of the steering wheel by the driver;
a steering angular velocity detection unit configured to detect a steering angular velocity as an operation velocity of the steering wheel by the driver;
a driven wheel control unit configured to control the wheel drive unit based on a final target turning angle obtained by an addition of a first target turning angle calculated based on the detected steering angle and a second target turning angle calculated based on the detected steering angular velocity; and a reaction force control unit configured to control the reaction force imparting unit based on a final target steering reaction force obtained by an addition of a first target steering reaction force calculated based on the calculated first target turning angle and a second target steering reaction force calculated based on the calculated second target turning angle, wherein the second target steering reaction force is calculated in such a manner that a variation of the second target steering reaction force corresponding to a variation of the second target turning angle is prevented.

11. The steering apparatus for a vehicle according to claim 1, wherein the second target steering reaction force calculation unit is configured to calculate the second target steering reaction force such that a variation of the second target steering reaction force corresponding to a transient variation of the second target turning angle is suppressed.

* * * * *